United States Patent
Yamada (10) Patent No.: US 6,202,122 B1
(45) Date of Patent: Mar. 13, 2001

(54) FACSIMILE APPARATUS USING A MEMORY DEVICE WITH RELOADABLE MEMORY BLOCK HAVING VARIABLE DATA OCCUPANCY RATE

(75) Inventor: Toru Yamada, Ueda (JP)

(73) Assignee: Matsushita Graphic Communication Systems, Inc., Tokyo (JP)

(*) Notice: Subject to any disclaimer, the term of this patent is extended or adjusted under 35 U.S.C. 154(b) by 0 days.

(21) Appl. No.: 09/173,277

(22) Filed: Oct. 14, 1998

Related U.S. Application Data (62) Division of application No. 08/783,215, filed on Jan. 14, 1997, now Pat. No. 6,125,423.

Foreign Application Priority Data

Jan. 16, 1996 (JP) .......................................... 8-4576

(51) Int. Cl.⁷ .............................. G06F 13/00; H04N 1/32
(52) U.S. Cl. .......................... 711/103; 358/404; 358/444; 711/103
(58) Field of Search ..................................... 711/103, 105, 711/147, 154, 165, 170, 173, 200; 358/404, 444

(56) References Cited

U.S. PATENT DOCUMENTS

| | | | | |
|---|---|---|---|---|
| 4,633,326 | * | 12/1986 | Endoh et al. | 358/406 |
| 5,307,176 | * | 4/1994 | Dweck et al. | 358/403 |
| 5,356,086 | * | 10/1994 | Takagi | 242/596.7 |
| 5,598,548 | * | 1/1997 | Matsuo et al. | 711/103 |

OTHER PUBLICATIONS

Andrew S. Tanenbaum, Structure computer organization, 3rd edition (1990).*

* cited by examiner

*Primary Examiner*—Tuan V. Thai
(74) *Attorney, Agent, or Firm*—Ratner & Prestia

(57) ABSTRACT

Among a plurality of blocks contained in a memory medium erasable in blocks, one block is always assigned to be vacant and not to store any user data (reloadable block), and the other blocks are assigned as data-input blocks for receiving user data. A block can store more than one file, and when any one of the stored files in one block becomes unnecessary and erasable, the necessary files stored in the block are moved to the reloadable block. The block containing the unnecessary file is erased thereby changing the block into a new reloadable block.

16 Claims, 5 Drawing Sheets

FACSIMILE APPARATUS USING A MEMORY DEVICE WITH RELOADABLE MEMORY BLOCK HAVING VARIABLE DATA OCCUPANCY RATE

This application is a division of U.S. patent application Ser. No. 08/783,215, filed Jan. 14, 1997, now U.S. Pat. No. 6,125,423.

FIELD OF THE INVENTION

The present invention relates to a memory device having a memory medium which is erasable in block units, and a facsimile apparatus using the memory device.

BACKGROUND OF THE INVENTION

A facsimile apparatus may employ a dynamic RAM (DRAM) or a static RAM (SRAM) as a memory for storing information to be sent or received. Such a memory may be employed because the facsimile apparatus first stores the information and then starts communication or recording by using the information. Both DRAM and SRAM have been widely used in facsimile apparatuses although they cannot retain information without a power supply. Recently, flash memories have become employed in facsimile apparatuses as a memory for storing information instead of DRAM or SRAM. This is because a flash memory can retain information without a power supply.

The flash memory has more than one block, and the capacity of each block depends on the memory size, but it is generally a rather large capacity such as 64 KB. The data stored in a flash memory is erasable in a blocks. Thus when a user wants to write new data into the flash memory, which is filled with other data, the user desirably first erases all the stored data before writing the new data. When more than one file is stored in a block, and some of the files are ready to be erased after completing their communication or recording, yet, the other files still await communications or recordings and are not erasable, the block cannot be erased. In other words, it is impossible to simply overwrite an erasable file with a new file. Thus, until all the files of the block complete their communications or recordings, the block is never erased and remains occupied. The operation efficiency of the block is thus reduced, and this may mislead users that the apparatus has malfunctioned, because the memory occupancy rate has not decreased although the communication has ended.

SUMMARY OF THE INVENTION

The present invention aims to overcome the above problem. In the memory device having more than one block, the present invention has the following three purposes:

The first purpose is to increase the operation efficiency of the memory medium which has more than one block and is erasable by blocks.

The second purpose is to avoid dividing one file and storing it across more than one block.

The third purpose is to minimize situations where one file is divided and stored across more than one block.

In the first exemplary embodiment of the present invention, a memory medium having a specified memory capacity and more than one block is prepared and at least one of the blocks remains vacant for accepting data (hereinafter called Reloadable Block). The data stored in the memory medium is erasable in a one block unit.

In this structure, when erasable data is in one of the blocks containing data, the other data in the specific block is transferred into the Reloadable Block. Thus, all of the data, including the erasable data of the specific block, may be erased. In other words, in the memory medium, erasable in blocks, erasable data can be erased anytime.

In the second exemplary embodiment of the present invention of the present invention, when a file becomes unnecessary among the files written in a block, files other than the unnecessary file are transferred into the Reloadable Block, and all other data including any unnecessary files in the specific block are erased. The specific block then becomes a new Reloadable Block. A new file may be written into the block where the unnecessary data occurred. Thus, the operational efficiency increases, and the new Reloadable Block is ready for accepting data from a block where another unnecessary file will occur.

In the third exemplary embodiment of the present invention of the present invention, the data occupancy rate is set in each block and, when data is stored over the occupancy rate, further data is prohibited from being written into the block and is written into another block. This enables one file to be stored into one block, and also avoids storing one file divided into two blocks. As a result, when one file becomes unnecessary, it is enough to erase that specific block.

In the fourth exemplary embodiment of the present invention of the present invention, a data occupancy rate is set in each block and, when a block is filled with data over the rate, writing is prohibited. When all of the blocks are prohibited from being written and still new data requires to be written, the new data is divided and written into vacant areas of each block corresponding to the sizes of the vacant areas. Therefore, the remaining vacant areas of each block can be utilized effectively.

In the fifth exemplary embodiment of the present invention of the present invention, when a file is divided and written into vacant areas of more than one block, corresponding to the sizes of the vacant areas, if any one of the blocks is erased the file which was divided and stored into the vacant areas is integrated again into one file and stored in the erased block. Accordingly, a file which was once divided and stored into the vacant areas of blocks can be integrated into one file again and then transferred into one block. Thus, when an unnecessary file occurs in a block it is enough to erase that block.

BRIEF DESCRIPTION OF THE DRAWINGS

FIGS. 4(a)–(c) illustrate that a block is prohibited to be written with a file when a data occupying rate of the block is exceeded.

FIGS. 5(a)–(b) depict an operation of writing a new file to divide into vacant areas of blocks.

DESCRIPTION OF THE PREFERRED EMBODIMENTS

The entire disclosure of U.S. patent application Ser. No. 08/783,215, filed Jan. 14, 1997 is expressly incorporated by reference herein.

Figure 1:
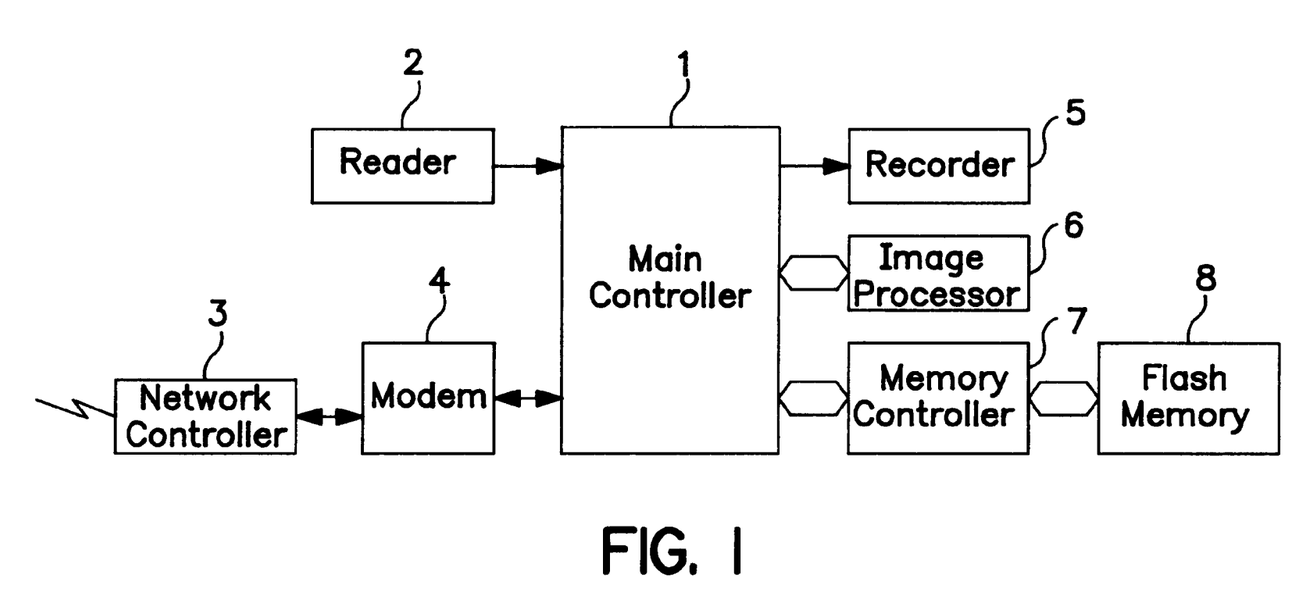
FIG. 1 is a block diagram of the facsimile apparatus described in the first exemplary embodiment of the present invention.

FIG. 1 is a block diagram illustrating the structure of a facsimile apparatus used in an exemplary embodiment of the present invention of the present invention. A main controller 1 controls the entire operation of the facsimile apparatus. A reader 2 reads a document to be transmitted or copied. A network controller 3 controls connections through communication lines such as calling, recovering or dialing. A MODEM 4 modulates video information to be transmitted, or demodulates received video information. A recorder 5 prints the received video information or video information read by reader 2 onto recording paper. An image processor 6 encodes the read video information, decodes the received video information, or processes the video information so as to provide magnification, reduction or rotation. The facsimile apparatus comprises those six parts, namely the main controller 1, reader 2, network controller 3, MODEM 4, recorder 5 and image processor 6.

Figure 2:
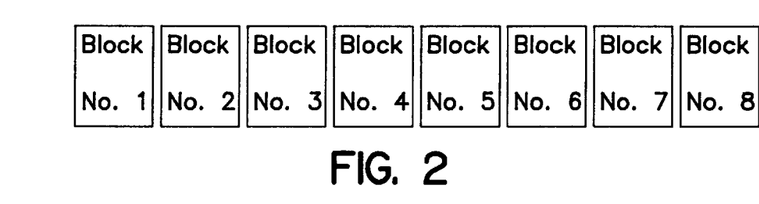
FIG. 2 illustrates a block diagram of a flash memory.

A memory controller 7 reads/writes data from/into flash memory 8, or erases data. The flash memory 8 can retain data without a power supply, and data therein is erased block by block. The memory device comprises the memory controller 7 and flash memory 8. FIG. 2 depicts the structure of the flash memory. The flash memory comprises a plurality of blocks. Each block has a specified memory capacity which the manufacturer of the flash memory specifies. FIG. 2 depicts the flash memory comprising 8 blocks, with each block having 64 KB, for example. Various numbers of blocks are available, such as 8, 16 or 32, depending on the memory capacity of the flash memory.

When data in the flash memory is erased, a cell storing each bit becomes "1". When writing a "1" into the flash memory, "1" stays the same, and when a "0" is written, the data changes from "1" to "0". However, "1" can be changed to "0" only when data is erased. Thus, overwriting cannot be done in a flash memory, although data can be overwritten in a DRAM. In other words, all the memory cells in a flash memory desirably stay "1" before being written with data. This is the reason why the data is erased block by block in the flash memory.

The first and second exemplary embodiment of the memory devices, according to the present invention, are now detailed: In the first exemplary embodiment of the present invention, at least one block of the flash memory is used as a reloadable block and the others are used for data input. In the second exemplary embodiment of the present invention, when an unnecessary file occurs in the data input block of the first exemplary embodiment of the present invention, the specific block storing the unnecessary file is erased. Thus, the second embodiment of the present invention controls the memory as if a memory is erased file by file.

Figure 3A:
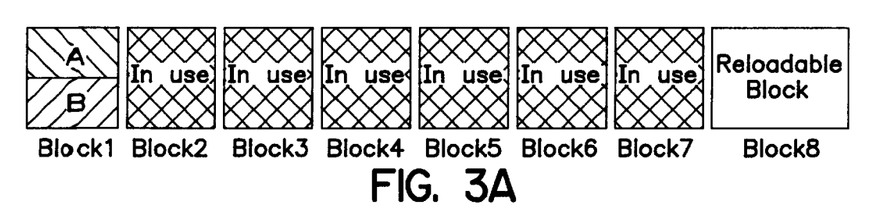
FIG. 3(a) illustrates the flash memory filled with data.
Figure 3B:
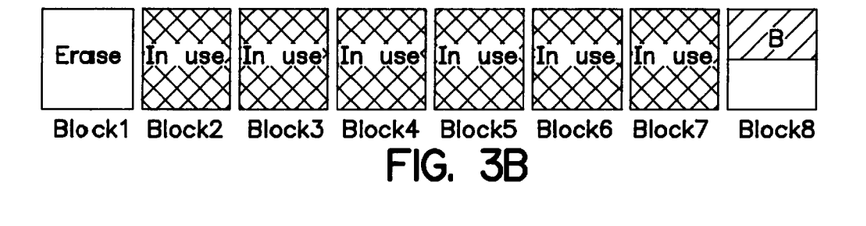
FIG. 3(b) illustrates how to erase an unnecessary file in one block. Both figures illustrate the operational status of each block in the first exemplary embodiment of the present invention.

FIGS. 3(a)-(b) depict the operation status of each block of the flash memory. FIG. 3(a) depicts that the flash memory is filled with data. Specifically, it depicts the first exemplary embodiment of the present invention. FIG. 3(b) depicts how to erase a block where an unnecessary file occurs. Specifically, it depicts the second exemplary embodiment of the present invention.

Among the eight blocks, one block remains vacant and is assigned as a reloadable block (in FIG. 3(a), block 8 is a reloadable block). The other 7 blocks are assigned as data input blocks (blocks 1–7 are assigned in FIG. 3(a)). Files are stored in blocks 1–7 sequentially. When the last block is filled additional files cannot be stored. Reloadable block 8 remains vacant. FIG. 3(a) depicts this status.

When file A of block 1 has completed a communication it is unnecessary and is ready for erasure. However, erasing the data in block 1 also erases the data of a file B. Thus, block 1 is not erased instantly. The present invention overcomes this problem and transfers all of the remained files (file B only in this case) of block 1 to reloadable block 8. Block 1 is then erased, thereby, changing block 1 into a new reloadable block. The former reloadable block 8 changes into a data input block. Since block 8 has vacant space, corresponding to file A, it is able to store new files. As a result, the memory operates as if the memory is erased file by file.

As explained in the first and second embodiment of the present invention, at least one reloadable block is prepared. When one or more files, stored in a block, become unnecessary, the other necessary files are moved into the reloadable block. The block containing the unnecessary files is now erased and becomes a new reloadable block. The block accepting the necessary files is still able to store other new files, thus, the operational efficiency of the memory device increases. Since a new reloadable block is prepared, when another unnecessary file occurs, the specific block including the unnecessary file can be erased using the same procedure.

The third exemplary embodiment of the present invention is now detailed: In this embodiment of the present invention, the respective occupancy rate of each block is predetermined. When the occupancy rate of a block is exceeded, the writing of data into that specific block is prohibited.

Figure 4A:
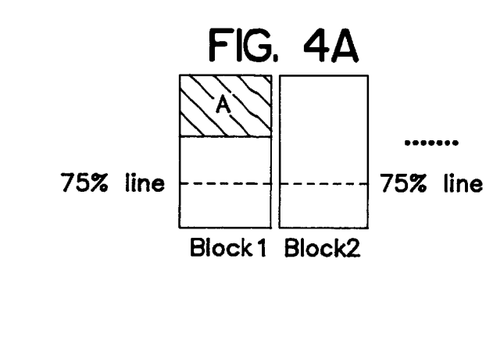
FIG. 4(a) depicts that Block 1 stores File A.
Figure 4B:
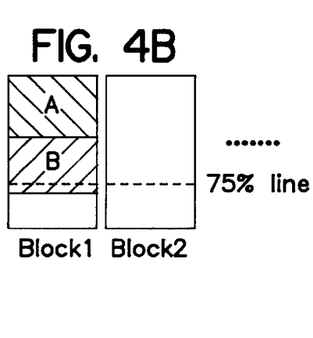
FIG. 4(b) depicts that Block 1 further stores File B and exceeds the specified rate.
Figure 4C:
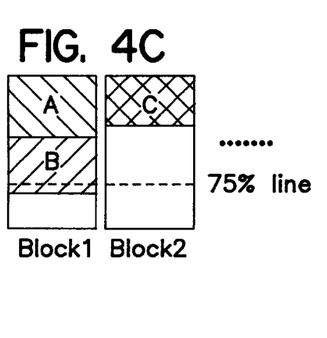
FIG. 4(c) depicts that Block 2 stores File C.

FIGS. 4(a)-(c) depict the performance of writing a file into a next block when a block is prohibited from accepting any further files because the block has exceeded its occupancy rate. In the third embodiment of the present invention, the occupancy rate is pre-determined to be 75%. The occupancy rate, meanwhile, can be selected corresponding to a document to be transmitted/received or copied. The occupancy rate of one block may be different than the occupancy rate of any other block.

When storing files into the blocks in sequence, the occupancy rate of each block is calculated every time the storing of a file is completed. If the occupancy rate of a block exceeds the predetermined rate (75% in this case), the block does not store further files, and the next block is used. FIG. 4(a) depicts that the block 1 stores file A and its occupancy rate does not reach 75%. In FIG. 4(b) block 1 further stores file B, thereby the occupancy rate exceeds 75%. Thus, the next file C is stored in block 2 as illustrated in FIG. 4(c). In this way, every file is stored block by block, and one file won't be divided into two blocks. If one file is divided and stored into two blocks, this file cannot be erased until these two blocks are erased. Thus, the occupancy rate of the memory is reduced. In the third exemplary embodiment of the present invention, at least one block is assigned to a reloadable block, and the others are assigned as data input blocks. The occupancy rate of each data-input-block is predetermined. When a block stores files over the predetermined rate, further files will not be stored. Therefore, every file is stored block by block, and is never divided and stored into two blocks. When a file becomes unnecessary, it is enough to erase the one block retaining this unnecessary file, as explained in the second exemplary embodiment of the present invention.

Next, the fourth exemplary embodiment of the present invention is explained here. In this embodiment of the present invention, another file to be written is input after every data-input-block is filled up to its respective predetermined occupancy rate. The file is divided and stored into vacant areas of each data-input-block according to their respective remaining storage capacities.

Figure 5A:
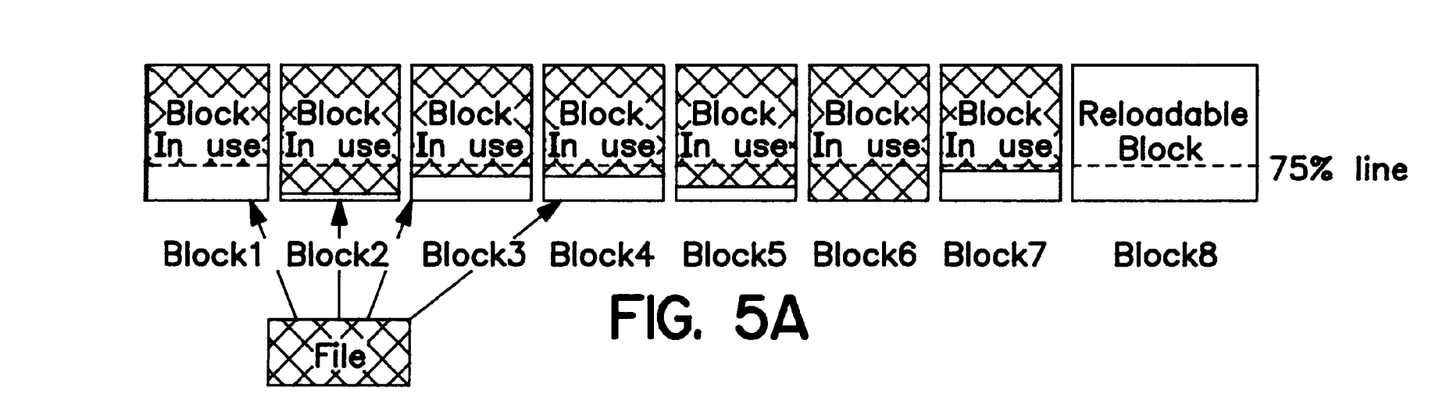
FIG. 5(a) depicts that each block is filled with files up to the specified data occupying rate and a new file is divided to be stored in the vacant areas of the blocks.

FIG. 5(a) depicts that every data-input-block 1–7 is fully utilized by storing files in these blocks sequentially. In this situation, another file requests to be stored; however, no block is available for storing this file. The vacant area of any block is searched. The file is then divided and stored into the vacant areas of these blocks. FIG. 5(a) depicts that the file is divided and stored into blocks 1–4. However, when one vacant area can store the complete file, the file should not be divided. In this way, when an additional file requests to be filed, although every block is already filled, the additional file is divided and stored into the vacant areas of each block. Thereby, utilizing the vacant memory areas effectively and increasing the operational rate is accomplished.

The fifth embodiment of the present invention is now explained. In the previous embodiment of the present invention, one file is divided and stored into a plurality of blocks. In this case, when the divided file becomes unnecessary, a part of the unnecessary file is retained for a long time because the plurality of blocks are not erased simultaneously. The fifth embodiment of the present invention shows how to overcome this problem: When one block, except the reloadable block 8, is erased and stays vacant, the divided file is integrated again and moves into the vacant block prior to other files.

Figure 5B:
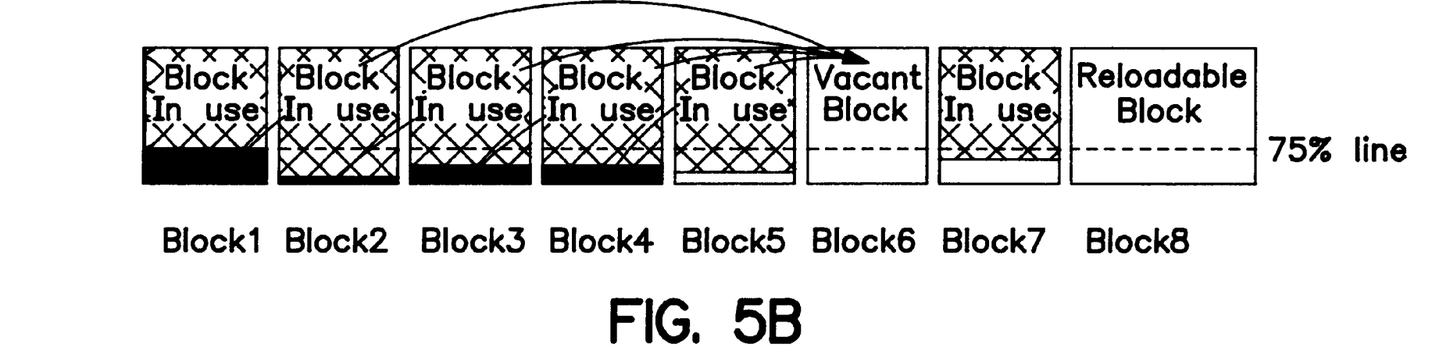
FIG. 5(b) depicts that the divided files stored in each block are integrated into one file again and transferred to a vacant block.

FIG. 5(b) depicts the above performance, namely, the file divided and stored into blocks 1–4 is integrated into one file again and moved into vacant block 6. Then, when a user wants to erase the moved file, it is sufficient to erase block 6. In FIG. 5(b), the area where the divided file was stored is not ready for receiving a new file. A file in use in block 1, for example, is transferred into the reloadable block 8, and block 1 is erased and becomes a reloadable block. In block 8, the areas, other than the area containing the file in use transferred from block 1, are vacant and write-enabled. In the same procedure, the areas of blocks 2–4, which contain parts of divided files, are cleared in order to become write-enabled. In other words, the same status as in FIG. 5(a) is produced. The areas, other than the area containing files in use, are able to become write-enabled.

As explained above, when a block, other than a reloadable block becomes vacant, a divided and stored file is integrated again and transferred into the vacant block, thereby preventing a file from being divided and stored.

Figure 6:
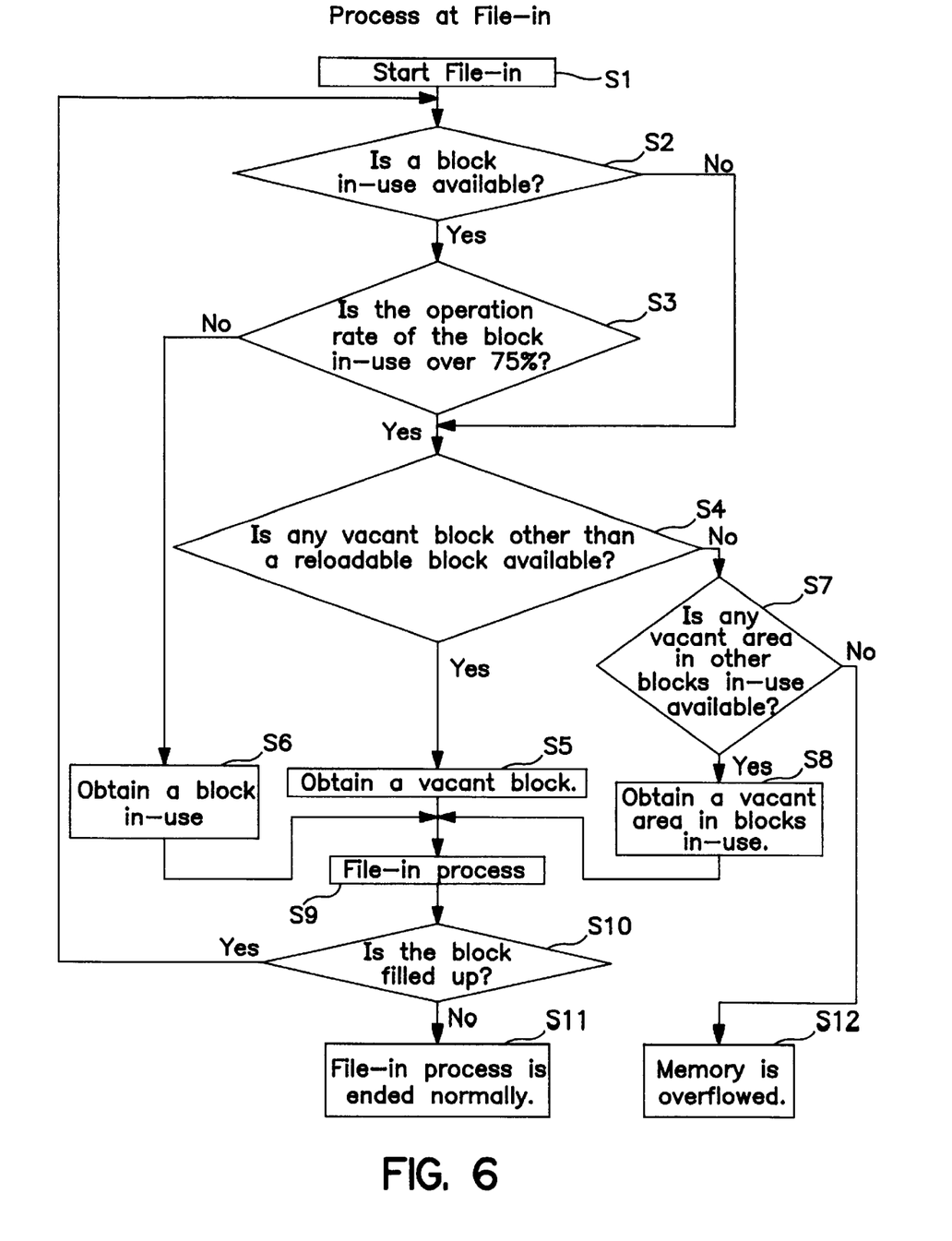
FIG. 6 is a flowchart depicting the operation of storing a file in a block according to an exemplary embodiment of the present invention.
Figure 7:
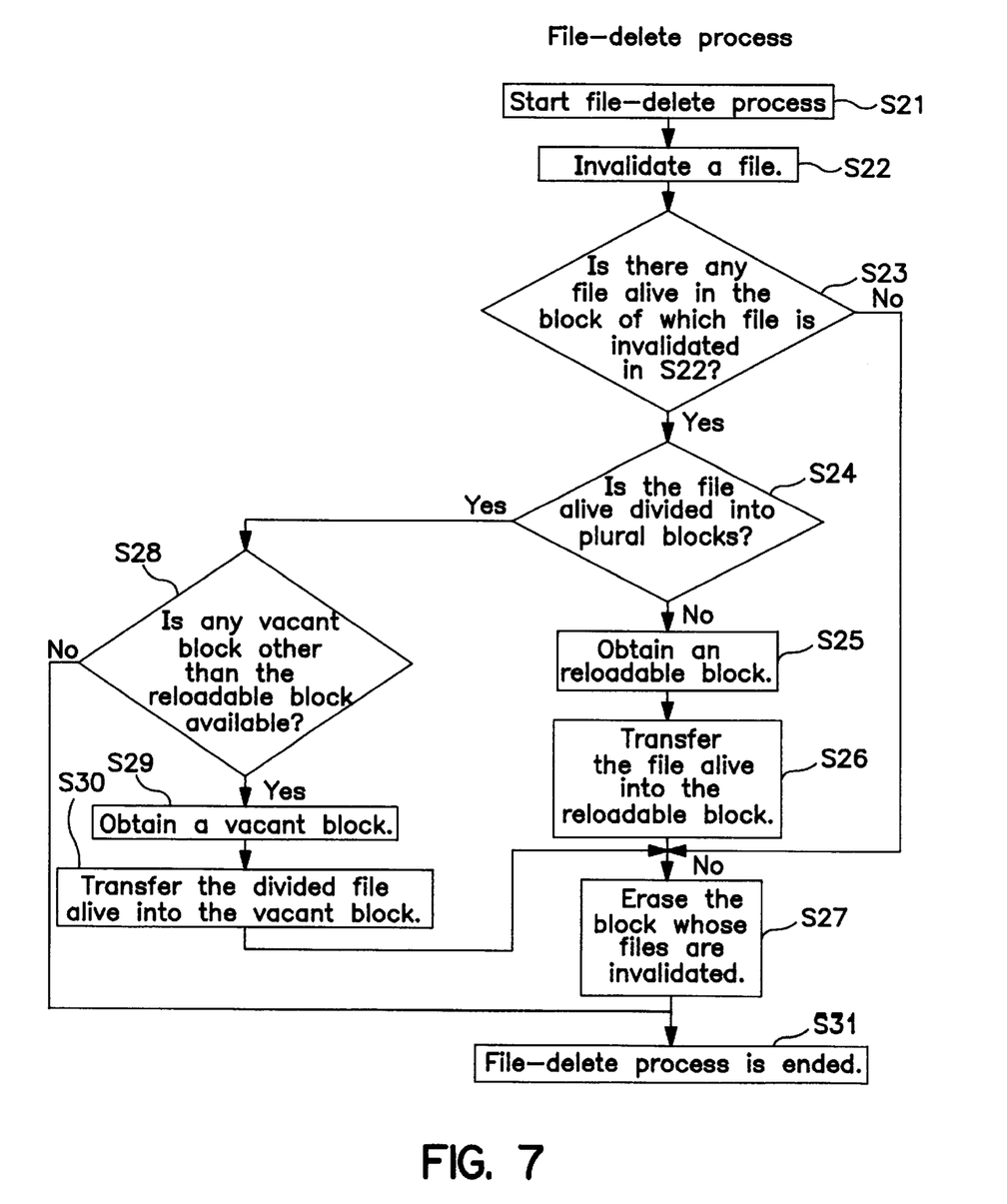
FIG. 7 is a flowchart depicting an operation how to erase a file according to the present invention.

FIG. 6 and FIG. 7 are flow charts illustrating the operation of each exemplary embodiment of the present invention of the present invention. FIG. 6 is a flow chart depicting a write-in of a file (file-in), and FIG. 7 is a flow chart depicting the block erasing operation when a file becomes unnecessary (file delete).

In FIG. 6, the following steps are taken:
S1: Start the file-in process.
S2: Search for a block in use.
S3: When a block in use is found, examine if its occupancy rate is over 75% or less.
S4: When the occupancy rate is over 75%, or the block in use is not found at S2, search for a vacant block except a reloadable block.
S5: When the vacant block is found, reserve it. This status corresponds to that explained in FIG. 4(b).
S6: In S3, when the occupancy rate is less than 75%, reserve the block in use. This corresponds to what was explained in FIG. 4(a).
S7: In S4, when a vacant block is not found, search the vacant areas of the blocks in use.
S8: When vacant areas are found in the blocks in use, reserve them. This status corresponds to that explained in FIG. 5(a), namely, a file is divided and stored into a plurality of vacant areas.
S9: Write a file into the block reserved through the above steps. A write-in according to S6 produces the status explained in FIG. 4(b). A write-in according to S5 produces the status explained in FIG. 5(b).
S10: When a block is filled up during the write-in of a file, divide the file and store it into the block and other blocks. Therefore, return to S2 and search for a block in use (S2). Take the same steps described above in order to write an unwritten part of a divided file into a block. Repeat S2–S9 until the divided file is completely written into vacant areas of the blocks.
S11: Complete the normal file-in process.
S12: In S7, when a vacant area is not found in other blocks in use, further storing of a file is prohibited because the memory has overflowed. The block erasing operation is explained in FIG. 7.
S21: Start deleting file process.
S22: Invalidate a file which has already completed transmission, or receiving and recording.
S23: Search any valid files in the block storing the invalidated files.
S27: If any valid files are not found, erase the block storing the invalid file.
S24: When some valid files are found, examine whether the valid file is divided and stored into a plurality of blocks.
S25: If the valid file is not divided, reserve a reloadable block.
S26: Then transfer the valid file into the reloadable block.
S27: Erase the block storing the invalid fie, and complete the file delete process. Steps 22–27 correspond to the status explained in FIG. 4(b).
S28: In C24, when the valid file is divided and stored into a plurality of blocks, search a vacant block other than the reloadable block.
S29: When the vacant block is found, reserve it.
S30: Transmit all of the divided files into this vacant block.
S27: Erase the block storing the invalidated file.
S31: Complete the file deleting process.

If a vacant block other than the reloadable block is not found, the block storing the invalidated file should not be erased. Therefore, leave the block which stores the invalid file, and terminate the file deleting process (S31).

As the above embodiment of the present inventions clearly explained, the present invention provides the following three effects in a memory device which is erasable in blocks:

(1) When one file becomes unnecessary, among a plurality of files stored in one block, the other files are transferred to the reloadable block. Then, data remaining in the specific block is erased, and the block accepting the other files has vacant capacity in order to store a new file corresponding to the erased file. Thus, the operating rate of the memory device increases.

(2) Predetermine the respective occupancy rate of each block, then prohibit a block which exceeds the occupancy rate from storing further files. Therefore, one file should not be divided into two parts and stored into two blocks. When an unnecessary file occurs, it is enough to erase the block storing the unnecessary file, thereby achieving an efficient erasing operation.

(3) Predetermine the respective occupancy rate of each block, then prohibit a block which exceeds the rate from storing further files. Then, a vacant area remains in each block. When every data-input block becomes a non-vacant block, one file is divided and stored into vacant areas of some blocks. As a result, the operational rate of the memory device further increases. When a divided file becomes unnecessary, this file is integrated into one file again and moved into a vacant data-input block, if available. and then this block should be erased. Thereby, an efficient block-erasing operation results.

While preferred embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the spirit and scope of the invention.

What is claimed is:

1. A facsimile apparatus comprising:
   (1) a facsimile unit; and
   (2) a memory device connected to said facsimile unit, wherein said memory device includes:
      (a) a memory medium comprising a plurality of blocks which are data input blocks, said memory medium being erasable on a block-by-block basis, and each of said plurality of blocks having a respective specified memory capacity,
      (b) control means for assigning at least one of said plurality of blocks as a user reloadable block which is write protected, and assigning all other blocks of said plurality of blocks as a plurality of data-input blocks, and
         when one or more files stored in one of said plurality of data-input blocks becomes an unnecessary file, said control means shifts necessary files from said one of said plurality of data-input blocks into said user reloadable block, then erases all files stored in said one of said plurality of data-input blocks, and assigns the erased block as a new reloadable block and said user reloadable block as a new data-input block.

2. The facsimile apparatus of claim 1, wherein each of said plurality of data-input blocks can accommodate at least one file.

3. The facsimile apparatus of claim 1, wherein said control means moves files other than an unnecessary file from one of said plurality of blocks into said user reloadable block, and then erases the data stored in said one of said plurality of blocks in order to make said block a further reloadable block.

4. The facsimile apparatus of claim 1, wherein said control means designates a data occupancy rate for each of said plurality of data-input blocks, and write-protects a respective one of said plurality of data-input blocks from storing further data when said respective data occupancy rate of said respective one of said plurality of data-input blocks is exceeded.

5. The facsimile apparatus of claims 1, wherein said control means divides an additional file requesting to be stored when every data-input block is write-protected from storing further data because said data occupancy rate is exceeded, and writes the divided file into vacant areas of said plurality of data-input blocks according to their respective vacant spaces.

6. The facsimile apparatus of claim 4, wherein after dividing and writing said additional file into the vacant areas according to the vacant spaces, said control means integrates the divided file into one file again, and moves the file into a vacant one of said plurality of blocks.

7. The facsimile apparatus of claim 1 further comprising means for transferring data from a first one of said plurality of blocks to a second one of said plurality of blocks after said respective specified memory capacity of said first one of said plurality of blocks is exceeded and for converting said first one of said plurality of blocks into said user reloadable block.

8. A facsimile apparatus comprising:
   (1) a facsimile unit; and
   (2) a memory device connected to said facsimile unit, wherein said memory device includes:
      (a) a memory medium comprising a plurality of blocks, said memory medium being erasable on a block by block basis, and each of said plurality of blocks having a respective specified memory capacity, and
      (b) control means for designating a data occupancy rate lower than full data occupancy rate for each block of said plurality of blocks, and write-protecting a respective one of said plurality of blocks from storing further data when the respective data occupancy rate of said respective one of said plurality of blocks is exceeded.

9. The facsimile apparatus of claim 8, wherein when every one of said plurality of blocks are write-protected from storing data, said control means divides an additional file requesting to be written, and writes the divided file into vacant areas of the plurality of blocks according to their respective vacant spaces.

10. The facsimile apparatus of claim 9, wherein after dividing and writing said additional file into the vacant areas according to the respective vacant spaces, said control means integrates the divided file into one file again, and moves the file into a vacant one of said plurality of blocks.

11. The facsimile apparatus of claim 8, further comprising means for transferring data from a first one of said plurality of blocks to a second one of said plurality of blocks after said respective specified memory capacity of said first one of said plurality of blocks is exceeded and for converting said first one of said plurality of blocks into a user reloadable block.

12. A memory device comprising:
   a memory medium comprising a plurality of blocks which are data input blocks, said memory medium being erasable on a block-by-block basis, and each of said plurality of blocks having a respective specified memory capacity, and
   control means for assigning at least one block of said plurality of blocks as a user reloadable block which is write protected, and assigning all other blocks of said plurality of blocks as a plurality of data-input blocks,
   wherein when one or more files stored in one of said plurality of data-input blocks becomes an unnecessary file, said control means shifts necessary files from said one of said plurality of data-input blocks into said user reloadable block, then erases all files stored in said one of said plurality of data-input blocks, and assigns the erased block as a new reloadable block and said user reloadable block as a new data-input block, and wherein when said respective one of said plurality of data-input blocks are write-protected, said control means divides an additional file requesting to be stored, in accordance with a capacity of respective vacant areas of each of the blocks, and writes the divided file into vacant areas of the blocks.

13. A memory device comprising:

a memory medium including a plurality of blocks which are data input blocks, said memory medium being erasable on a block-by-block basis, and each of said plurality of blocks having a respective specified memory capacity, control means for assigning at least one block of said plurality of blocks as a user reloadable block which is write-protected, and assigning all other blocks of said plurality of blocks as data-input blocks, said control means designates a data occupancy rate lower than full data occupancy rate for each block of said plurality of data-input blocks, and write-protects a respective one of said plurality of data-input blocks from storing further data, even if vacant areas exist in each of said plurality of data-input blocks, when said respective data occupancy rate of said respective one of said plurality of data-input blocks is exceeded, wherein when said respective one of said plurality of data-input blocks are write-protected, said control means divides an additional file requesting to be stored, in accordance with a capacity of respective vacant areas of each of the blocks, and writes the divided file into vacant areas of the blocks.

14. The memory device of claim 13, wherein after dividing and writing said additional file into each of the vacant areas according to the respective vacant areas in each of said plurality of blocks, when a vacant one of data-input blocks is generated other than the reloadable blocks, said control means integrates the divided file into one file again, and moves the file into said vacant one of said data-input blocks.

15. A memory device comprising:

a memory medium comprising a plurality of data-input blocks, said memory medium being erasable on a block-by-block basis, and each of said plurality of data-input blocks having a respective specified memory capacity; and control means for designating a respective data occupancy rate lower than full data occupancy rate for each block of said plurality of data-input blocks, and write-protecting a respective one of said plurality of data-input blocks from storing further data even if vacant areas exist, when said respective data occupancy rate of said respective one of said plurality of data-input blocks is exceeded, wherein when said plurality of data-input blocks are write-protected, said control means divides an additional file requesting to be stored in accordance with a capacity of respective vacant areas of each of the data-input blocks, and writes the divided file into the vacant areas of the data-input blocks, and wherein after dividing and writing said additional file into each of the vacant areas according to the respective vacant areas in each of said plurality of blocks, when a vacant one of said data-input blocks is generated other than reloadable blocks, said control means integrates the divided file into one file again, and moves the file into said vacant one of said data-input blocks.

16. A memory device comprising:

a flash memory including a plurality of data-input blocks, said flash memory being erasable on a block-by-block basis, and each of said plurality of data-input blocks having a respective specified memory capacity; and control means for designating a data occupancy rate lower than full data occupancy rate for each block of each of said plurality of data-input blocks, and write-protecting a respective one of said plurality of data-input blocks from storing further data even if vacant areas exist, when said respective data occupancy rate of said respective one of said plurality of data-input blocks is exceeded, wherein when said plurality of data-input blocks are write-protected, said control means divides an additional file requesting to be stored in accordance with a capacity of respective vacant areas of each block, and writes the divided file into vacant areas of blocks, and wherein after dividing and writing said additional file into each of the vacant areas according to the respective vacant areas in each of said plurality of blocks, when a vacant one of said data-input blocks is generated other than reloadable blocks, said control means integrates the divided file into one file again, and moves the file into said vacant one of said data-input blocks.

* * * * *